(12) United States Patent
Ge

(10) Patent No.: US 12,264,754 B2
(45) Date of Patent: Apr. 1, 2025

(54) ELECTROMAGNETIC DISTRIBUTOR AND TOILET

(71) Applicant: Shanghai Kohler Electronics, Ltd., Shanghai (CN)

(72) Inventor: Xiaobing Ge, Shanghai (CN)

(73) Assignee: Shanghai Kohler Electronics, Ltd., Shanghai (CN)

( * ) Notice: Subject to any disclaimer, the term of this patent is extended or adjusted under 35 U.S.C. 154(b) by 259 days.

(21) Appl. No.: 18/101,632

(22) Filed: Jan. 26, 2023

(65) Prior Publication Data

US 2023/0167919 A1    Jun. 1, 2023

Related U.S. Application Data

(62) Division of application No. 17/318,057, filed on May 12, 2021, now Pat. No. 11,598,443.

(30) Foreign Application Priority Data

Jun. 4, 2020   (CN) .......................... 202010497979.3

(51) Int. Cl.
   *F16K 31/08*   (2006.01)
   *E03D 1/36*    (2006.01)
   (Continued)

(52) U.S. Cl.
   CPC ........ *F16K 31/082* (2013.01); *F16K 31/0675* (2013.01); *H01F 7/04* (2013.01)

(58) Field of Classification Search
   CPC ....... F16K 31/082; F16K 31/0675; H01F 7/04
   See application file for complete search history.

(56) References Cited

U.S. PATENT DOCUMENTS 2,226,856 A * 12/1940 Gunter ...................... H01F 7/16
                                                          236/75
5,259,416 A    11/1993 Kunz et al.
(Continued)

FOREIGN PATENT DOCUMENTS

CN       201916266 U    8/2011
CN       202327236 U    7/2012
(Continued)

OTHER PUBLICATIONS

Chinese Office Action for Chinese Application No. 202010497979.3 dated Aug. 18, 2021.

*Primary Examiner* — Eric Keasel
(74) *Attorney, Agent, or Firm* — Lempia Summerfield Katz LLC

(57) ABSTRACT

The present disclosure discloses a method for controlling opening and closing of at least one water outlet of an electromagnetic distributor, the method comprising: detecting, by at least one sensor, a current position, relative to the at least one water outlet, of at least one solenoid valve core; determining, by a controller, a current state of the at least water outlet according to the detected current position of the at least one solenoid valve core; generating, by an electromagnetic coil, a magnetic field force on the at least one solenoid valve core; adjusting, by the controller, a direction and an amount of the magnetic field force on the at least one solenoid valve core according to the determined current state of the at least one water outlet; and controlling, by the controller, a movement, relative to the at least one water outlet, of the at least one solenoid valve core.

20 Claims, 5 Drawing Sheets

(51) Int. Cl.
*F16K 31/06* (2006.01)
*H01F 7/04* (2006.01)

(56) References Cited

U.S. PATENT DOCUMENTS

| | | | | |
|---|---|---|---|---|
| 5,605,173 | A | * | 2/1997 | Arnaud ................ F16K 11/24 137/7 |
| 6,293,516 | B1 | | 9/2001 | Parsons et al. |
| 6,948,697 | B2 | * | 9/2005 | Herbert ................ F16K 37/00 251/129.17 |

FOREIGN PATENT DOCUMENTS

| | | | |
|---|---|---|---|
| CN | 103410979 | A | 11/2013 |
| CN | 203906966 | U | 10/2014 |
| CN | 205154325 | U | 4/2016 |
| CN | 207961627 | U | 10/2018 |
| EP | 0688554 | A1 | 12/1995 |

\* cited by examiner

ELECTROMAGNETIC DISTRIBUTOR AND TOILET

CROSS REFERENCES TO RELATED APPLICATIONS

This application is a divisional application of co-pending U.S. patent application Ser. No. 17/318,057, filed May 12, 2021, which is hereby incorporated by reference in its entirety, and which claims the benefit of priority to Chinese Patent Application No. 202010497979.3 filed in the Chinese Intellectual Property Office on Jun. 4, 2020, which is hereby incorporated by reference in its entirety.

FIELD

The present disclosure relates to the technical field of intelligent sanitary apparatus and method, in particular to an electromagnetic distributor and a toilet.

BACKGROUND

In the water channel system of smart bathroom equipment, a water channel distributor is usually set to control the water channels so that the water outlet mode can meet the needs of users.

The water channel distributor usually uses a stator and a rotor to cooperate to realize the water channel control. Specifically, the stator is provided with a plurality of water inlets along the circumferential direction, and the rotor is provided with a water outlet, and the water outlet and the water inlets are on the same circumference. The rotor and the stator are relatively rotated. When the water outlet on the rotor coincides with one of the water inlets on the stator, one water channel is opened and other water channels are closed to realize the switching of different water channels. In the actual operation process, the applicant found that the above-mentioned electromagnetic distributor has the following shortcomings: firstly, the distributor uses a stepper motor to control the rotor to rotate in the circumferential direction to control the position of the water outlet to realize the switching of different water channels. The response time is relatively long and cannot meet the needs of rapid switching; secondly, the opening and closing of each water channel of the distributor cannot be independently controlled and only one water channel can be opened at the same time. The water outlet method is single, which cannot meet the diverse water outlet needs.

SUMMARY

The present disclosure provides an electromagnetic distributor and a toilet to solve the problems in the prior art, shorten the response time, and realize multiple water outlet modes by independently opening and closing multiple water outlets.

The present disclosure provides an electromagnetic distributor, it comprises: a housing provided with a water inlet and at least two water outlets connected with the water inlet; at least two solenoid valve cores, wherein the at least two solenoid valve cores and the at least two water outlets are arranged in one-to-one correspondence; a magnetic conducting part, wherein at least two magnetic conducting chambers are arranged on the magnetic conducting part and an electromagnetic loop is formed in any of the magnetic conducting chambers; wherein the at least two solenoid valve cores are arranged in one-to-one correspondence in the at least two magnetic conducting chambers; wherein any one of the solenoid valve cores moves away from or close to the corresponding water outlet under the action of the magnetic field generated by the corresponding electromagnetic loop, so as to independently control the opening and closing of the corresponding water outlet.

In one embodiment, the electromagnetic distributor further comprises at least two permanent magnets, the at least two permanent magnets are arranged in the at least two magnetic conducting chambers in one-to-one correspondence; any one of the solenoid valve cores is located between the corresponding permanent magnet and the water outlet.

In one embodiment, the electromagnetic distributor further comprises a sealing gasket and the sealing gasket is sealingly arranged in the magnetic conducting chamber and located between the permanent magnet and the solenoid valve core.

In one embodiment, the electromagnetic distributor further comprises an elastic part and the elastic part is compressed and arranged between the solenoid valve core and the sealing gasket.

In one embodiment, the electromagnetic distributor further comprises a sealing cap with elasticity and the sealing cap is arranged on the solenoid valve core and disposed at an outer side of an end of the solenoid valve core close to the corresponding water outlet, so as to seal the water outlet when the solenoid valve core abuts on the corresponding water outlet.

In one embodiment, the magnetic conducting part comprises a magnetic conducting upper cover and a magnetic conducting lower cover, the magnetic conducting upper cover and the magnetic conducting lower cover are interlocked to define an accommodating chamber, at least two coil frames are arranged in the accommodating chamber, any one of the coil frames is wound with an electromagnetic coil, and any one of the coil frames is provided with the magnetic conducting chamber.

In one embodiment, the electromagnetic distributor further comprises a magnetic conducting rod, the magnetic conducting rod is arranged in the magnetic conducting chamber and located at the side of the permanent magnet facing away from the solenoid valve core.

In one embodiment, the housing includes a valve upper cover, a valve middle cover, and a valve lower cover that are sequentially connected; the water inlet and the at least two water outlets are both arranged on the valve upper cover; the valve middle cover is provided with at least two guide holes, the magnetic conducting part is located between the valve middle cover and the valve lower cover, and the at least two solenoid valve cores pass through the at least two guide holes in one-to-one correspondence and then extend toward the corresponding water outlets.

In one embodiment, the electromagnetic distributor further comprises a threading plug, a threading hole is provided on the valve lower cover, and the threading plug is clamped on the threading hole, both ends of the electromagnetic coil pass through the housing from the threading plug.

Based on the same inventive concept, the present disclosure also provides a toilet including the electromagnetic distributor described in any one of the above.

The toilet provided by the embodiments of the present disclosure controls at least two water outlets in a one-to-one correspondence through at least two solenoid valve cores. Each solenoid valve core can independently move closer to or away from the corresponding water outlet under the force generated by a corresponding magnetic field in order to independently control the opening and closing of the corresponding water outlet and achieve the effect of independent opening and closing of the at least two water outlets. By individually controlling the direction of the magnetic field force in each magnetic conducting chamber, the arbitrary switching and combination of the opening and closing states of the at least two water outlets can be realized, and a variety of water outlet methods can be achieved. After the magnetic field force in the magnetic conducting chamber is generated, the solenoid valve core is immediately forced to move, which accelerates the response speed and shortens the response time.

BRIEF DESCRIPTION OF THE FIGURES

Hereinafter, the embodiments of the present disclosure are described in detail through the accompanying drawings to help understand the purposes and advantages of the present disclosure, in which.

DESCRIPTION OF REFERENCE SIGNS

Figure 1:
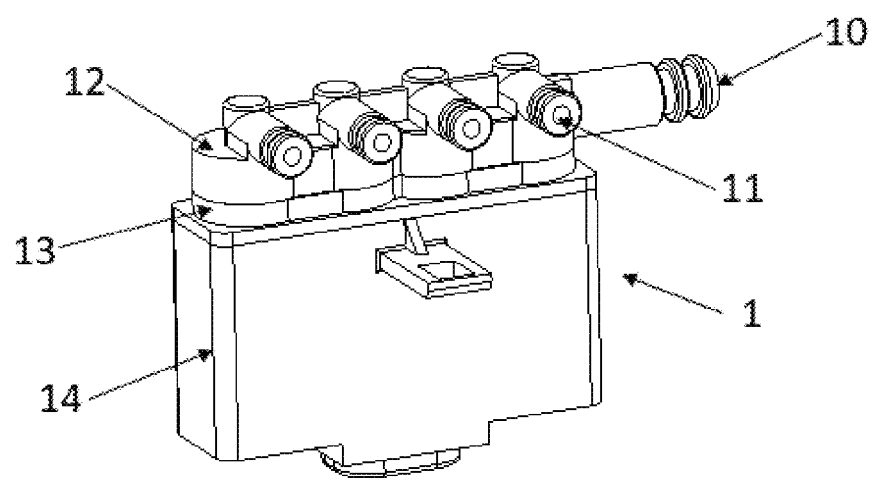
FIG. 1 is a schematic structural diagram of an electromagnetic distributor provided by an alternative embodiment of the present disclosure.

1—housing, 10—water inlet, 11—water outlet, 12—valve upper cover, 13—valve middle cover, 14—valve lower cover;
2—solenoid valve core;
3—magnetic conducting part, 30—magnetic conducting chamber, 31—magnetic conducting upper cover, 32—magnetic conducting lower cover, 33—coil frame, 34—permanent magnet, 35—magnetic conducting rod, 36—elastic part, 37—sealing gasket, 38—electromagnetic coil;
4—sealing cap;
5—threading plug;
100—system for controlling opening and closing of each water outlet 11 of an electromagnetic distributor;
110—controller;
120—sensor; and
130—communication unit.

DETAILED DESCRIPTION

The directional terms such as up, down, left, right, front, back, front side, back side, top, bottom, etc. mentioned or possibly mentioned in this specification are defined relative to the structure shown in the drawings. The words "inner" and "outer" respectively refer to the direction toward or away from the geometric center of a specific component. They are relative concepts, so they may change correspondingly according to their different positions and different usage conditions. Therefore, these or other directional terms should not be interpreted as restrictive terms.

As shown in FIGS. 1 to 4, the electromagnetic distributor provided by the present disclosure comprises: a housing 1, at least two solenoid valve cores 2, and a magnetic conducting part 3.

Please refer to FIGS. 1 to 4 at the same time, the housing 1 is provided with a water inlet 10 and at least two water outlets 11 connected with the water inlet 10. The at least two solenoid valve cores 2 and the at least two water outlets 11 are arranged in one-to-one correspondence. At least two magnetic conducting chambers 30 are arranged on the magnetic conducting part 3, an electromagnetic loop is formed in any one of the magnetic conducting chambers 30. The at least two solenoid valve cores 2 are arranged in one-to-one correspondence in the at least two magnetic conducting chambers 30. Any one of the solenoid valve cores 2 moves away from or close to the corresponding water outlet 11 under the action of the magnetic field generated by the corresponding electromagnetic loop, so as to independently control the opening and closing of the corresponding water outlet 11.

It should be noted that the magnetic field force generated by the electromagnetic loop is a vector force. By switching the direction of current on the electromagnetic loop, a magnetic field force directed to the corresponding water outlet 11 or a magnetic field force directed away from the corresponding water outlet 11 can be generated on the solenoid valve core 2. When the solenoid valve core 2 receives the magnetic field force directed to the corresponding water outlet 11, the solenoid valve core 2 moves toward the corresponding water outlet 11 until it abuts on the corresponding water outlet 11, so that the corresponding water outlet 11 is in a closed state. When the solenoid valve core 2 receives a magnetic field force directed away from the corresponding water outlet 11, the solenoid valve core 2 moves away from the corresponding water outlet 11 until it separates from the corresponding water outlet 11, so that the corresponding water outlet 11 is in an open state. The solenoid valve core 2 in this embodiment may be a stainless soft magnetic valve core, which has good magnetism and corrosion resistance.

Figure 2:
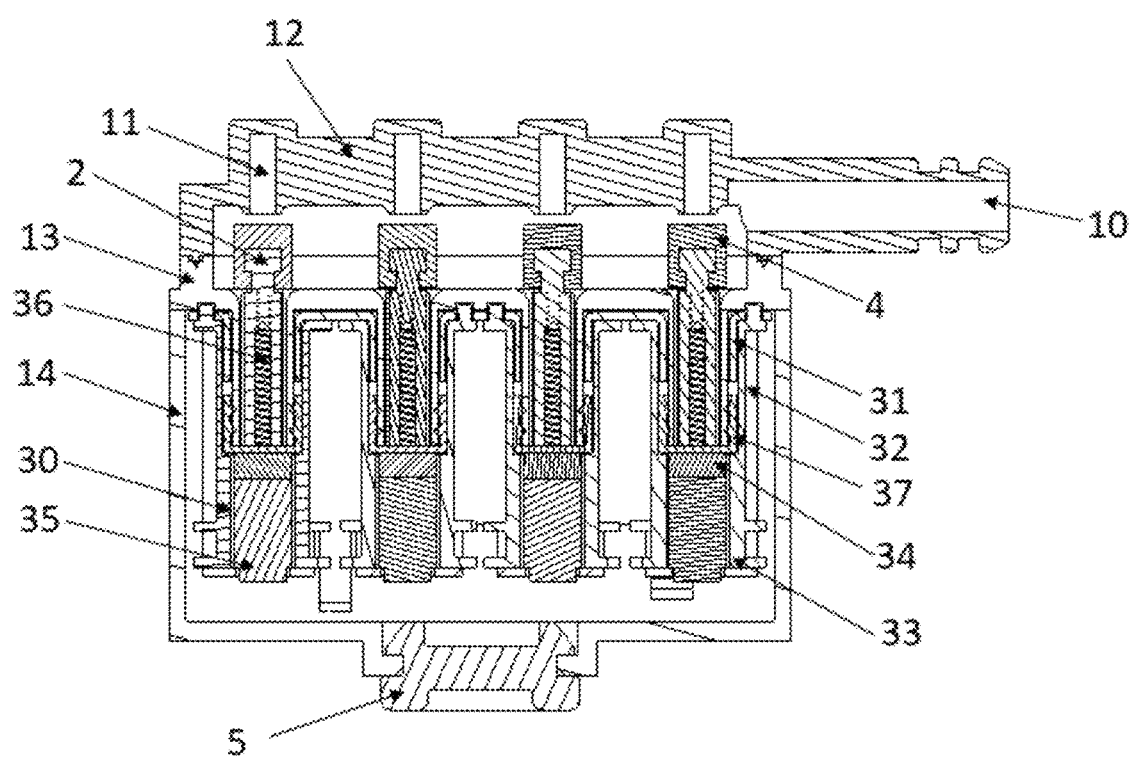
FIG. 2 is a cross-sectional view of an electromagnetic distributor provided by an alternative embodiment of the present disclosure.
Figure 3:
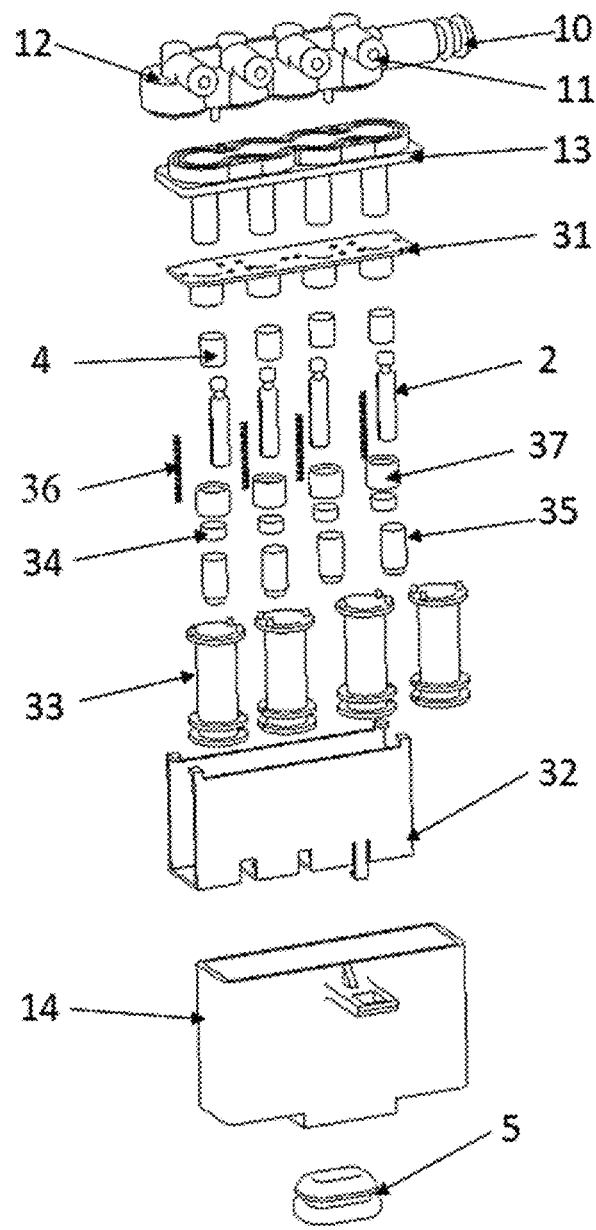
FIG. 3 is an exploded view of an electromagnetic distributor provided by an alternative embodiment of the present disclosure.
Figure 4:
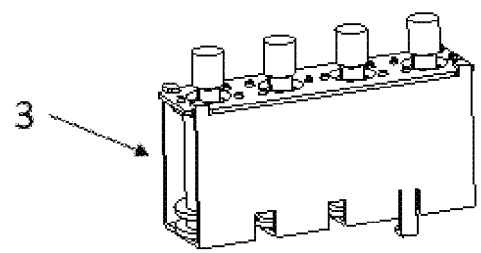
FIG. 4 is a schematic structural diagram of a magnetic conducting part equipped with a solenoid valve core provided by an alternative embodiment of the present disclosure.

FIGS. 2 and 3 show that the number of the solenoid valve cores 2 is four, and the four solenoid valve cores 2 are arranged in one-to-one correspondence with the four water outlets 11. Each solenoid valve core 2 can individually control the opening and closing of the corresponding water outlet 11. By arbitrarily combining the control states of the four solenoid valve cores 2, a variety of water outlet modes can be realized. For example, among the four solenoid valve cores 2, two solenoid valve cores 2 all control the corresponding water outlets 11 to close, and the other two solenoid valve cores 2 alternately control the corresponding water outlets 11 to open. Optionally, any water outlet 11 can be connected to the water inlet of the spray nozzle and the outlet of the spray nozzle is used to clean the human body. When at least two water outlets 11 have multiple water outlet modes, there are also multiple water outlet types of the water outlets of the corresponding spray nozzle. The number of solenoid valve cores 2 is not limited to four and the control combination mode between the solenoid valve cores 2 is also not limited to the above-described modes.

The electromagnetic distributor provided by the embodiments of the present disclosure controls at least two water outlets 11 in a one-to-one correspondence through at least two solenoid valve cores 2. Each solenoid valve core 2 can independently move closer to or away from the corresponding water outlet 11 under the force generated by a corresponding magnetic field in order to independently control the opening and closing of the corresponding water outlet 11 and achieve the effect of independent opening and closing of the at least two water outlets 11. By individually controlling the direction of the magnetic field force in each magnetic conducting chamber 30, the arbitrary switching and combination of the opening and closing states of the at least two water outlets 11 can be realized and a variety of water outlet methods can be achieved. After the magnetic field force in the magnetic conducting chamber 30 is generated, the solenoid valve core 2 is immediately forced to move, which accelerates the response speed and shortens the response time.

In one embodiment, the electromagnetic distributor further comprises at least two permanent magnets 34 and the at least two permanent magnets 34 are arranged in the at least two magnetic conducting chambers 30 in one-to-one correspondence. Any one of the solenoid valve cores 2 is located between the corresponding permanent magnet 34 and the water outlet 11. When the magnetic field force disappears or it faces away from the corresponding water outlet 11, the solenoid valve core 2 can be adsorbed on the permanent magnet 34 and kept away from the corresponding water outlet 11, preventing the solenoid valve core 2 from being closed by mistake due to shaking and other causes and increasing the control accuracy. When the magnetic field force directs to the corresponding water outlet 11 and the magnetic field force received by the solenoid valve core 2 is greater than the adsorption force of the permanent magnet 34 on the solenoid valve core 2, the solenoid valve core 2 separates from the permanent magnet 34 and moves toward the direction close to the corresponding water outlet 11. The permanent magnet 34 in this embodiment may be a neodymium iron boron magnet to have better magnetism.

In one embodiment, the electromagnetic distributor further comprises a sealing gasket 37, the sealing gasket 37 is sealingly arranged in the magnetic conducting chamber 30 and located between the permanent magnet 34 and the solenoid valve core 2. The sealing gasket 37 in this embodiment can reduce the impact noise generated by the solenoid valve core 2 hitting the permanent magnet 34 and the impact on the permanent magnet 34 when the solenoid valve core 2 reciprocates between the permanent magnet 34 and the water outlet 11, thereby buffering and reducing noise effect. In addition, the sealing gasket 37 in this embodiment also functions to seal and isolate the permanent magnet 34 and the solenoid valve core 2, preventing the water entering the housing 1 from the water inlet 10 from immersing under the permanent magnet 34, thereby improving the sealing effect. FIGS. 2 and 3 show an alternative structure of the sealing gasket 37. As shown in FIGS. 2 and 3, the sealing gasket 37 can be a sleeve structure with one end closed, and the closed end of the sleeve structure is located between the solenoid valve core 2 and the permanent magnets 34, which has the effect of buffering and reducing noise. The part of the sleeve structure extending in the axial direction is used to accommodate the solenoid valve core 2 and guide the solenoid valve core 2 when the solenoid valve core 2 reciprocates. The sealing gasket 37 in this embodiment may be an Ethylene-Propylene-Diene Monomer (EPDM) rubber sealing gasket which has good corrosion resistance and aging resistance effects.

In one embodiment, the electromagnetic distributor further comprises an elastic part 36, the elastic part 36 is compressed and arranged between the solenoid valve core 2 and the sealing gasket 37. The elastic part 36 in this embodiment is always in a compressed state during the reciprocating movement of the solenoid valve core 2, so as to provide a stable supporting force to the solenoid valve core 2 when the solenoid valve core 2 moves to abut on the corresponding water outlet 11 to enable the solenoid valve core 2 to stably block the water outlet 11. FIGS. 2 and 3 show an alternative structure of the elastic part 36. As shown in FIGS. 2 and 3, the elastic part 36 may be a spring and the solenoid valve core 2 is provided with a mounting hole at the end facing the sealing gasket 37 for accommodating the spring. The axial direction of the mounting hole is consistent with the movement direction of the solenoid valve core 2 and the axial direction of the solenoid valve core 2, so as to guide the spring in the axial direction of the solenoid valve core 2 so that the elastic force of the spring is always kept consistent with the axial direction of the solenoid valve core 2. The spring can be made of SUS316 stainless steel to have good corrosion resistance and toughness.

In one embodiment, the electromagnetic distributor further comprises a sealing cap 4 with elasticity, the sealing cap 4 is arranged on the solenoid valve core 2 and disposed at an outer side of an end of the solenoid valve core 2 close to the corresponding water outlet 11, so as to seal the water outlet 11 when the solenoid valve core 2 abuts on the corresponding water outlet 11. The sealing cap 4 in this embodiment can undergo a certain deformation after being squeezed by the solenoid valve core 2 and tightly abut on the corresponding water outlet 11 to improve the sealing effect of the water outlet 11. FIGS. 2 and 3 show an optional structure of the sealing cap 4. As shown in FIGS. 2 and 3, the sealing cap 4 can be provided with a necking embedding groove. One end of the solenoid valve core 2 facing the corresponding water outlet 11 is provided with a clamping boss and a diameter reduction part with its outer diameter smaller than the clamping boss. The clamping boss is clamped into the embedding groove and is confined in the embedding groove by the necking opening. The diameter reduction part is clamped at the necking opening of the embedding groove, which increases the stability of the structure of the sealing cap 4 being installed on the solenoid valve core 2. The sealing cap 4 in this embodiment may be an EPDM (Ethylene-Propylene-Diene Monomer) rubber cap to have good corrosion resistance and aging resistance effects.

Figure 6:
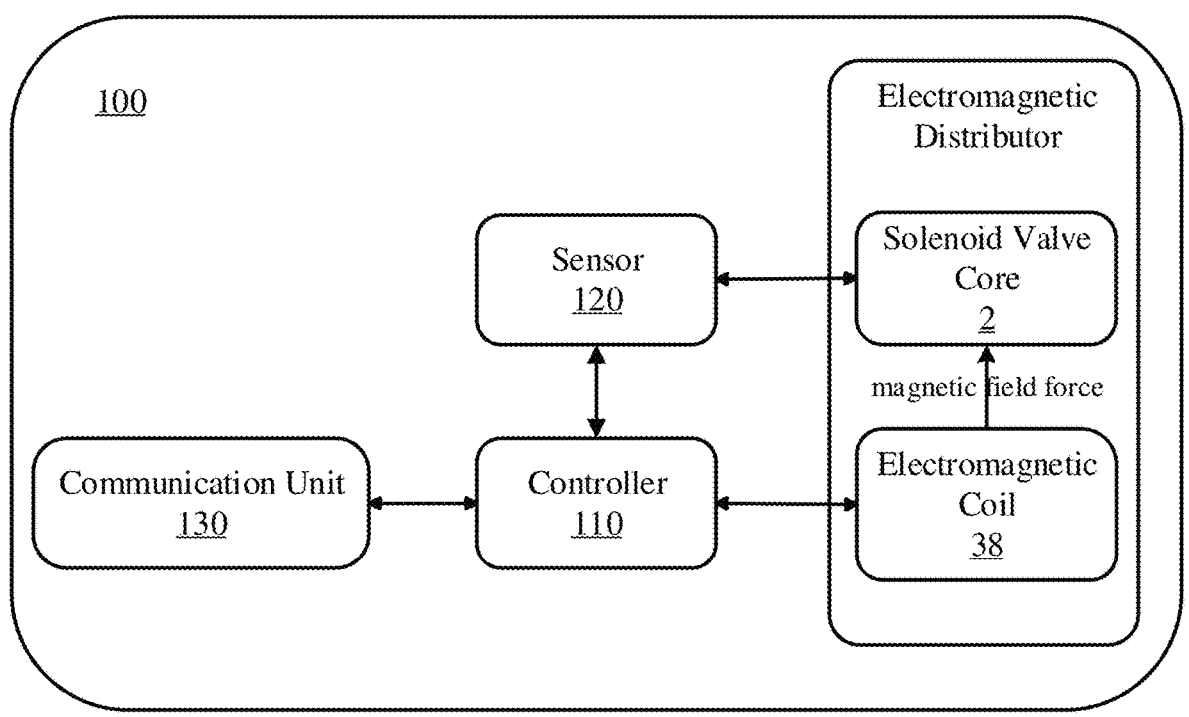
FIG. 6 is a block diagram illustrating a system for controlling opening and closing of each water outlet of an electromagnetic distributor according to an embodiment of the present disclosure.

In one embodiment, the magnetic conducting part 3 comprises a magnetic conducting upper cover 31 and a magnetic conducting lower cover 32. The magnetic conducting upper cover 31 and the magnetic conducting lower cover 32 are interlocked to define an accommodating chamber and at least two coil frames 33 are arranged in the accommodating chamber. Any one of the coil frames 33 is wound with an electromagnetic coil 38 (as shown in FIG. 6) and any one of the coil frames 33 is provided with the magnetic conducting chamber 30. Both the magnetic conducting upper cover 31 and the magnetic conducting lower cover 32 in this embodiment can be made of magnetic materials such as pure iron and can be connected by riveting to form an electromagnetic loop. The electromagnetic coil 38 may be a copper coil, and the electromagnetic coil 38 forms a magnetic field extending in the axial direction of the solenoid valve core 2 in the magnetic conducting chamber 30 after being powered on. When the direction of the current changes, the direction of the magnetic field also changes. For example, when a forward voltage (e.g., 24V) is provided to the electromagnetic coil 38, the electromagnetic coil 38 generates a magnetic field force on the solenoid valve core 2 directed to the water outlet 11. The solenoid valve core 2 may overcome the attractive force of the permanent magnet 34 under the action of the magnetic field force to move toward the direction close to the corresponding water outlet 11 until it abuts on the corresponding water outlet 11. The solenoid valve core 2 may keep the static state of abutting on the corresponding water outlet 11 under the action of the elastic part 36, thereby blocking the corresponding water outlet 11 to control the corresponding water outlet 11 to close. When a reverse voltage is provided to the electromagnetic coil 38, the electromagnetic coil 38 generates a magnetic field force on the solenoid valve core 2 directed away from the water outlet 11. The solenoid valve core 2 may move downward against the elastic force of the elastic part 36 under the action of the magnetic field force until it abuts on the sealing gasket 37. The solenoid valve core 2 may keep a static state under the attraction of the permanent magnet 34, so that the corresponding water outlet 11 is opened and water outflow is restored. In addition, when pulse power is applied to the electromagnetic coil 38, the solenoid valve core 2 reciprocates with the pulse frequency and controls the water outlet 11 to open and close at the pulse frequency so that the corresponding water outlet 11 discharges water at the pulse frequency. Once the pulse frequency changes, the frequency of the water outflow of the corresponding water outlet 11 will be changed accordingly to meet various user's needs. As shown in FIG. 2, four coil frames 33 can be arranged in sequence to reduce the interference of their respective magnetic fields.

In one embodiment, the electromagnetic distributor further comprises a magnetic conducting rod 35, the magnetic conducting rod 35 is arranged in the magnetic conducting chamber 30 and located at the side of the permanent magnet 34 facing away from the solenoid valve core 2. The magnetic conducting rod 35 in this embodiment can guide the magnetic field force generated by the electromagnetic coil 38 to the direction consistent with the axial direction of the solenoid valve core 2 to enhance the magnetic field force acting on the solenoid valve core 2. The magnetic conducting rod 35 in this embodiment can be made of a magnetic conducting material such as pure iron, which is easy to magnetize.

In one embodiment, the housing 1 includes a valve upper cover 12, a valve middle cover 13, and a valve lower cover 14 that are sequentially connected. The water inlet 10 and the at least two water outlets 11 are both arranged on the valve upper cover 12. The valve middle cover 13 is provided with at least two guide holes. The magnetic conducting part 3 is located between the valve middle cover 13 and the valve lower cover 14. The at least two solenoid valve cores 2 pass through the at least two guide holes in one-to-one correspondence and then extend toward the corresponding water outlets 11. The valve upper cover 12, the valve middle cover 13 and the valve lower cover 14 in this embodiment are connected to form a closed housing 1 structure, wherein the guide hole plays a role of guiding the solenoid valve core 2. The valve upper cover 12 and the valve middle cover 13 can be connected by ultrasonic welding to define a chamber through which water can flow in and out as shown in FIG. 2. The valve middle cover 13 and the valve lower cover 14 can also be connected by ultrasonic welding to define a chamber for installing the magnetic conducting part 3 and the solenoid valve core 2. After the valve middle cover 13 and the valve lower cover 14 are welded and connected, by size defining, the magnetic conducting upper cover 31 and the magnetic conducting lower cover 32 located between the valve middle cover 13 and the valve lower cover 14 and connected each other by riveting can be tightened and restricted. FIG. 2 shows an alternative embodiment in which the solenoid valve core 2 passes through the guide hole. It can be seen from the FIG. 2 that the sealing cap 4 sleeved on the end of the solenoid valve core 2 and the solenoid valve core 2 are both embedded in the guide hole, the friction between the solenoid valve core 2 and the inner wall of the guide hole can be reduced, and the solenoid valve core 2 can be protected.

In one embodiment, the electromagnetic distributor further comprises a threading plug 5. A threading hole is provided on the valve lower cover 14 and the threading plug 5 is clamped on the threading hole. Both ends of the electromagnetic coil 38 pass through the housing 1 from the threading plug 5. The threading plug 5 in this embodiment facilitates the two ends of the electromagnetic coil 38 to pass through the housing 1 to be installed on the power supply terminals and the power supply to the electromagnetic coil 38 is realized through the power supply terminals. The threading plug 5 in this embodiment can be a rubber plug. The rubber plug produces a tightening and sealing effect on the part of the electromagnetic coil 38 that passes through the rubber plug under the action of its own elasticity, which enhances the structural stability of the part of the electromagnetic coil 38 that passes through the threading plug 5. As shown in FIGS. 2 and 3, when the number of the coil frames 33 is four, both ends of the electromagnetic coil 38 wound on each coil frame 33 all penetrate out of the housing 1 through the rubber plug. The rubber plug is used to position the parts of which each electromagnetic coil 38 penetrates out of the housing 1, which is beneficial to avoid signal interference between the electromagnetic coils 38 and further improve the accuracy of control.

Based on the same inventive concept, the present disclosure also provides a toilet including the electromagnetic distributor of any one of the above embodiments.

The toilet provided by the embodiments of the present disclosure controls at least two water outlets 11 in a one-to-one correspondence through at least two solenoid valve cores 2. Each solenoid valve core 2 can independently move closer to or away from the corresponding water outlet 11 under the force generated by a corresponding magnetic field in order to independently control the opening and closing of the corresponding water outlet 11 and achieve the effect of independent opening and closing of the at least two water outlets 11. By individually controlling the direction of the magnetic field force in each magnetic conducting chamber 30, the arbitrary switching and combination of the opening and closing states of the at least two water outlets 11 can be realized and a variety of water outlet methods can be achieved. After the magnetic field force in the magnetic conducting chamber 30 is generated, the solenoid valve core 2 is immediately forced to move, which accelerates the response speed and shortens the response time.

At least one sensor may be included to detect certain actions and/or to provide functionality (e.g., a movement of each solenoid valve core 2, etc.). The sensor may include proximity sensors and motion sensors, which are non-limiting examples of sensors employed with the apparatus and the method of the present disclosure. Proximity sensors may be employed to detect the presence of an object within a zone of detection without physical contact between the object and the sensor. Electric potential sensors (e.g., Plessey epic sensors), low capacity sensors (e.g., ultra-low capacity), capacitance sensors, projected capacitance sensors, and infrared sensors (e.g., projected infrared sensors, passive infrared sensors) are non-limiting examples of proximity sensors that may be employed with the apparatus and the method of the present disclosure. Motion sensors may be employed to detect motion (e.g., a change in position of an object relative to the objects surroundings). Electric potential sensors (e.g., Plessey epic sensors), optic sensors, radio-frequency (RF) sensors, sound sensors, magnetic sensors (e.g., magnetometers), vibration sensors, and infrared sensors (e.g., projected infrared sensors, passive infrared sensors) are non-limiting examples of motion sensors that may be employed with apparatus and the method of the present disclosure.

A controller may be included to control the above discussed elements (e.g., the solenoid valve cores 2, etc.) and can be implemented by any appliances. The controller may include a processor, a memory, and a communication interface for interfacing with the devices as discussed in the present disclosure. The components of the controller may communicate using bus. The controller may be connected to a workstation or another external device (e.g., control panel, remote) and/or a database for receiving user inputs, system characteristics, and any of the values described herein. Optionally, the controller may include an input device and/or a sensing circuit in communication with any of the sensors. The sensing circuit receives sensor measurements from as described above. Optionally, the controller may include a drive unit for receiving and reading non-transitory computer media having instructions. Additional, different, or fewer components may be included. The processor is configured to perform instructions stored in memory for executing the algorithms described herein.

The controller may include a processor, a memory, and a communication interface for interfacing with the devices as discussed in the present disclosure. The components of the controller may communicate using bus. The controller may be connected to a workstation or another external device (e.g., control panel, remote) and/or a database for receiving user inputs, system characteristics, and any of the values described herein. Optionally, the controller may include an input device and/or a sensing circuit in communication with any of the sensors. The sensing circuit receives sensor measurements from as described above. Optionally, the controller may include a drive unit for receiving and reading non-transitory computer media having instructions. Additional, different, or fewer components may be included. The processor is configured to perform instructions stored in memory for executing the algorithms described herein.

Processor may be a general purpose or specific purpose processor, an application specific integrated circuit (ASIC), one or more programmable logic controllers (PLCs), one or more field programmable gate arrays (FPGAs), a group of processing components, or other suitable processing components. Processor is configured to execute computer code or instructions stored in memory or received from other computer readable media (e.g., embedded flash memory, local hard disk storage, local ROM, network storage, a remote server, etc.). The processor may be a single device or combinations of devices, such as associated with a network, distributed processing, or cloud computing.

Memory may include one or more devices (e.g., memory units, memory devices, storage devices, etc.) for storing data and/or computer code for completing and/or facilitating the various processes described in the present disclosure. Memory may include random access memory (RAM), read-only memory (ROM), hard drive storage, temporary storage, non-volatile memory, flash memory, optical memory, or any other suitable memory for storing software objects and/or computer instructions. Memory may include database components, object code components, script components, or any other type of information structure for supporting the various activities and information structures described in the present disclosure. Memory may be communicably connected to processor via a processing circuit and may include computer code for executing (e.g., by processor) one or more processes described herein. For example, memory may include graphics, web pages, HTML files, XML files, script code, shower configuration files, or other resources for use in generating graphical user interfaces for display and/or for use in interpreting user interface inputs to make command, control, or communication decisions.

In addition to ingress ports and egress ports, the communication interface may include any operable connection. An operable connection may be one in which signals, physical communications, and/or logical communications may be sent and/or received. An operable connection may include a physical interface, an electrical interface, and/or a data interface. The communication interface may be connected to a network. The network may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network may be a public network, such as the Internet, a private network, such as an intranet, or combinations thereof, and may utilize a variety of networking protocols now available or later developed including, but not limited to TCP/IP based networking protocols.

While the computer-readable medium (e.g., memory) is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored. The computer-readable medium may be non-transitory, which includes all tangible computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

Figure 5:
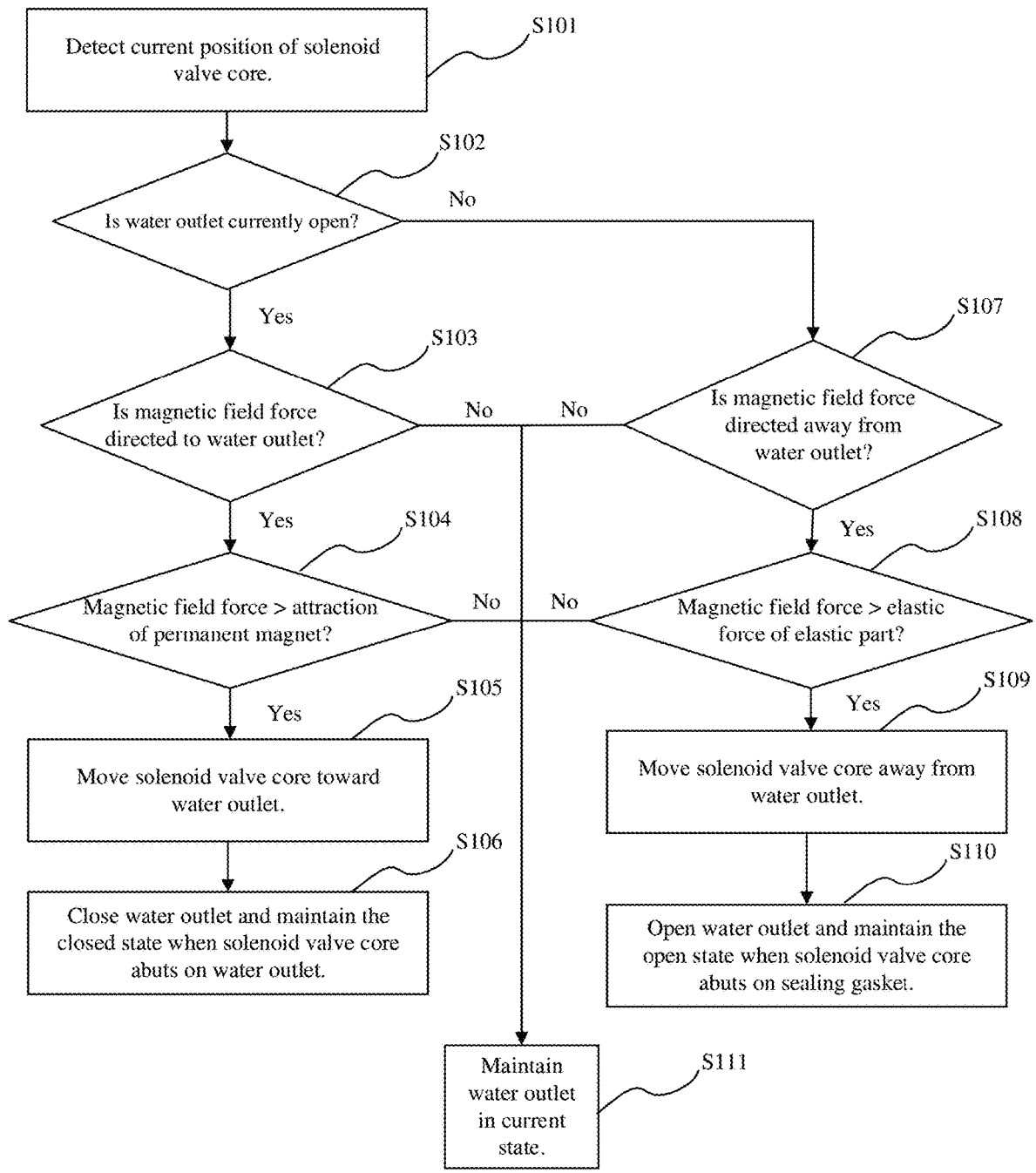
FIG. 5 is a flow chart illustrating a method for opening and closing each water outlet of an electromagnetic distributor according to an embodiment of the present disclosure.

As shown in FIG. 5, the present disclosure further provides a method for opening and closing each water outlet 11 of the electromagnetic distributor as discussed above. A user may send a request to the controller as discussed above to open or close the water outlets 11. The request may be a request to open or close a particular water outlet 11. When receiving the request from the user, the controller may initiate the method of the present disclosure by sending an instruction to the sensor as discussed above.

At S101, when receiving the instruction from the controller, the sensor may detect a current position, relative to each water outlet 11, of the solenoid valve core 2 in the corresponding magnetic conducting chamber 30. Specifically, the sensor may detect whether the solenoid valve core 2 abuts on the corresponding water outlet 11 or the corresponding sealing gasket 37. The sensor may detect whether the solenoid valve core 2 is disposed at a position between the corresponding water outlet 11 and the corresponding sealing gasket 37. In an embodiment, only one sensor may be included to detect the current position of each of the solenoid valve cores 2. In another embodiment, the number of the sensors may correspond to the number of the solenoid valve cores 2. Thus, each of the sensors may respectively detect the current position of the corresponding solenoid valve core 2. In an embodiment, the sensor may selectively detect the current position of a particular solenoid valve core 2 according to the instruction from the controller.

At S102, the controller may determine a current state of the water outlet 11 according to the detected current position of the corresponding solenoid valve core 2. The current state of the water outlet 11 may be an open state or a closed state. Specifically, the controller may determine that the water outlet 11 is in the open state when the corresponding solenoid valve core 2 abuts on the corresponding sealing gasket 37. The controller may also determine that the water outlet 11 is in the open state when the corresponding solenoid valve core 2 is disposed at any position between the corresponding water outlet 11 and the corresponding sealing gasket 37. The controller may determine that the water outlet 11 is in the close state when the corresponding solenoid valve core 2 abuts on the corresponding water outlet 11.

The acts S103-S111 below illustrate how the controller adjusts a direction and an amount of the magnetic field force on the solenoid valve cores 2 according to the determined current state of each water outlet 11. The acts S103-S111 below further illustrate how the controller controls a movement, relative to the at least one water outlet 11, of each solenoid valve core 2 according to the adjusted direction and the adjusted amount of the magnetic field force on each solenoid valve core 2.

At S103, when the controller determines that the water outlet 11 is in the open state, the controller may further determine whether a magnetic field force in the magnetic conducting chamber 30 is directed to the corresponding water outlet 11. As discussed above, the electromagnetic coil 38 may generate a magnetic field force on the solenoid valve core 2 in the magnetic conducting chamber 30. When a forward voltage (e.g., 24V) is provided to the electromagnetic coil 38, the electromagnetic coil 38 generates a magnetic field force on the solenoid valve core 2 directed to the water outlet 11.

At S104, when the controller determines that the magnetic field force in the magnetic conducting chamber 30 is directed to the corresponding water outlet 11, the controller may further determine whether the magnetic field force in the magnetic conducting chamber 30 is larger than an attraction of the corresponding permanent magnet 34. As discussed above, the permanent magnet 34 may generate an attraction, directed away from the water outlet 11, on the solenoid valve core 2.

When the controller determines that the magnetic field force in the magnetic conducting chamber 30 is not directed to the corresponding water outlet 11, the corresponding water outlet 11 is maintained in its current state (i.e. the open state) at S111.

In another embodiment, when the controller determines that the magnetic field force in the magnetic conducting chamber 30 is not directed to the corresponding water outlet 11 and receives a request to close the water outlet 11 from the user, the controller may adjust the magnetic field force to direct toward the water outlet 11 by providing the forward voltage to the electromagnetic coil 38. Thus, the method proceeds to S105 instead of S111.

At S105, when the controller determines that the magnetic field force in the magnetic conducting chamber 30 is larger than the attraction of the corresponding permanent magnet 34, the magnetic field force may move the solenoid valve core 2 toward the corresponding water outlet 11.

When the controller determines that the magnetic field force in the magnetic conducting chamber 30 is not larger than the attraction of the corresponding permanent magnet 34, the corresponding water outlet 11 is maintained in its current state (i.e. the open state) at S111.

In another embodiment, when the controller determines that the magnetic field force in the magnetic conducting chamber 30 is not larger than the attraction of the corresponding permanent magnet 34 and receives a request to close the water outlet 11 from the user, the controller may adjust the magnetic field force to be larger than the attraction of the corresponding permanent magnet 34. Thus, the method proceeds to S106 instead of S111.

At S106, under the magnetic field force, the solenoid valve core 2 is moved toward the corresponding water outlet 11 until the solenoid valve core 2 abuts on the corresponding water outlet 11. Thus, the corresponding water outlet 11 is closed and maintained in the closed state.

At S107, when the controller determines that the water outlet 11 is in the closed state, the controller may further determine whether a magnetic field force in the magnetic conducting chamber 30 is directed away from the corresponding water outlet 11. As discussed above, when a reverse voltage is provided to the electromagnetic coil 38, the electromagnetic coil 38 generates a magnetic field force on the solenoid valve core 2 directed away from the water outlet 11.

At S108, when the controller determines that the magnetic field force in the magnetic conducting chamber 30 is directed away from the corresponding water outlet 11, the controller may further determine whether the magnetic field force in the magnetic conducting chamber 30 is larger than an elastic force of the corresponding elastic part 36. As discussed above, the elastic part 36 may generate an elastic force, directed toward the water outlet 11, on the solenoid valve core 2.

When the controller determines that the magnetic field force in the magnetic conducting chamber 30 is not directed away from the corresponding water outlet 11, the corresponding water outlet 11 is maintained in its current state (i.e. the closed state) at S111.

In another embodiment, when the controller determines that the magnetic field force in the magnetic conducting chamber 30 is not directed away from the corresponding water outlet 11 and receives a request to open the water outlet 11 from the user, the controller may adjust the magnetic field force to direct away from the water outlet 11 by providing the reverse voltage to the electromagnetic coil 38. Thus, the method proceeds to S109 instead of S111.

At S109, when the controller determines that the magnetic field force in the magnetic conducting chamber 30 is larger than the elastic force of the corresponding elastic part 36, the magnetic field force may move the solenoid valve core 2 away from the corresponding water outlet 11.

When the controller determines that the magnetic field force in the magnetic conducting chamber 30 is not larger than the elastic force of the corresponding elastic part 36, the corresponding water outlet 11 is maintained in its current state (i.e. the closed state) at S111.

In another embodiment, when the controller determines that the magnetic field force in the magnetic conducting chamber 30 is not larger than the elastic force of the corresponding elastic part 36 and receives a request to open the water outlet 11 from the user, the controller may adjust the magnetic field force to be larger than the elastic force of the corresponding elastic part 36. Thus, the method proceeds to S110 instead of S111.

At S110, under the magnetic field force, the solenoid valve core 2 is moved away from the corresponding water outlet 11 until the solenoid valve core 2 abuts on the corresponding sealing gasket 37. Thus, the corresponding water outlet 11 is open and maintained in the open state.

The method according to the present disclosure controls at least one water outlet 11 according to the request from the user. For example, at least two water outlets 11 may be controlled through the corresponding solenoid valve cores 2. Each solenoid valve core 2 can independently move closer to or away from the corresponding water outlet 11 under the force generated by a corresponding magnetic field in order to independently control the opening and closing of the corresponding water outlet 11 and achieve the effect of independent opening and closing of the at least two water outlets 11. By individually controlling the direction of the magnetic field force in each magnetic conducting chamber 30, the arbitrary switching and combination of the opening and closing states of the at least two water outlets 11 can be realized and a variety of water outlet methods can be achieved. After the magnetic field force in the magnetic conducting chamber 30 is generated, the solenoid valve core 2 is immediately forced to move, which accelerates the response speed and shortens the response time.

FIG. 6 is a block diagram illustrating a system for controlling opening and closing of each water outlet of an electromagnetic distributor according to an embodiment of the present disclosure.

As shown in FIGS. 1-6, the system 100 comprises an electromagnetic distributor, a controller 110 communicably coupled to the electromagnetic distributor, a sensor 120 communicably coupled to the controller 110, and a communication unit 130 communicably coupled to the controller 110.

The electromagnetic distributor of the system 100 may be the electromagnetic distributor according to the above examples of the present disclosure and may be configured to perform an operation, function, or the like as described in the present disclosure. Thus, the above detailed description of the electromagnetic distributor is incorporated herein.

As noted above, the electromagnetic distributor comprises the housing 1 comprising the water inlet 10 and the water outlet 11 in communication with the water inlet 10. The electromagnetic distributor also comprises the magnetic conducting chamber 30 and the solenoid valve core 2 disposed in the magnetic conducting chamber 30. The electromagnetic distributor also comprises the electromagnetic coil 38 configured to generate the magnetic field force on the solenoid valve core 2 in the magnetic conducting chamber 30.

The controller 110 of the system 100 may be the controller according to the above examples of the present disclosure and may be configured to perform an operation, function, or the like as described in the present disclosure. Thus, the above detailed description of the controller is incorporated herein.

The controller 110 is configured to determine a current state of the water outlet 11 according to the detected current position of the solenoid valve core 2 in the magnetic conducting chamber 30. The controller 110 is also configured to adjust, in response to a request from a user, a direction and an amount of the magnetic field force on the solenoid valve core 2 according to the determined current state of the water outlet 11. The controller 110 is also configured to control a movement, relative to the water outlet 11, of the solenoid valve core 2 according to the adjusted direction and the adjusted amount of the magnetic field force on the solenoid valve core 2.

The sensor 120 of the system 100 may be the sensor according to the above examples of the present disclosure and may be configured to perform an operation, function, or the like as described in the present disclosure. Thus, the above detailed description of the sensor is incorporated herein.

The sensor 120 is configured to detect a current position, relative to the water outlet 11, of the solenoid valve core 2 in the magnetic conducting chamber 30.

The communication unit 130 is configured to communicate with a user terminal (e.g., a remote control). Thus, the communicate unit 130 may receive an operation command (e.g., a request) from the remote control.

The communication unit 130 may include any operable connection, ingress ports, and egress ports. An operable connection may be one in which signals, physical communications, and/or logical communications may be sent and/or received. An operable connection may include a physical interface, an electrical interface, and/or a data interface. The communication unit 130 may be connected to a network. The network may include wired networks (e.g., Ethernet), wireless networks, or combinations thereof. The wireless network may be a cellular telephone network, an 802.11, 802.16, 802.20, or WiMax network, a Bluetooth pairing of devices, or a Bluetooth mesh network. Further, the network may be a public network, such as the Internet, a private network, such as an intranet, or combinations thereof, and may utilize a variety of networking protocols now available or later developed including, but not limited to TCP/IP based networking protocols.

The system 100 may comprise any number of the water outlet 11. For example, the system 100 may comprise one water outlet 11. Thus, the system 100 may comprise one solenoid valve core 2 and one magnetic conducting chamber 30. In another example, the system 100 may comprise two water outlets 11. Thus, the system 100 may comprise two solenoid valve cores 2 and two magnetic conducting chambers 30.

Finally, it should be noted that the above embodiments are only used to illustrate the technical solutions of the present disclosure and the present disclosure are not limited to them. Although the present disclosure has been described in detail with reference to the foregoing embodiments, those of ordinary skill in the art should understand that: the technical solutions recorded in the foregoing embodiments can be modified, or some of the technical features can be equivalently replaced. These modifications or replacements do not cause the essence of the corresponding technical solutions to deviate from the scope of the present disclosure.

I claim:

1. A method for controlling opening and closing of at least one water outlet of an electromagnetic distributor, the method comprising:
   detecting, by at least one sensor, a current position, relative to the at least one water outlet, of at least one solenoid valve core in at least one magnetic conducting chamber;
   determining, by a controller, a current state of the at least water outlet according to the detected current position of the at least one solenoid valve core in the at least one magnetic conducting chamber;
   generating, by an electromagnetic coil, a magnetic field force on the at least one solenoid valve core in the at least one magnetic conducting chamber;
   adjusting, by the controller in response to a request from a user, a direction and an amount of the magnetic field force on the at least one solenoid valve core according to the determined current state of the at least one water outlet; and
   controlling, by the controller, a movement, relative to the at least one water outlet, of the at least one solenoid valve core according to the adjusted direction and the adjusted amount of the magnetic field force on the at least one solenoid valve core.

2. The method according to claim 1, further comprising:
   generating, by a permanent magnet, an attraction, directed away from the at least one water outlet, on the at least one solenoid valve core,
   wherein when the controller determines that the at least one water outlet is in an open state and receives a request to close the at least one water outlet from the user, the controller adjusts the magnetic field force to direct toward the at least one water outlet and to be larger than the attraction on the at least one solenoid valve core so as to move the at least one solenoid valve core toward the at least one water outlet.

3. The method according to claim 2, further comprising:
   maintaining the at least one water outlet in a closed state by moving the at least one solenoid valve core toward the at least one water outlet until the at least one solenoid valve core abuts on the at least one water outlet.

4. The method according to claim 2, further comprising:
   maintaining the at least one water outlet in the open state when the controller determines that the magnetic field force is directed away from the at least one water outlet or the magnetic field force on the at least one solenoid valve core is smaller than the attraction on the at least one solenoid valve core.

5. The method according to claim 1, further comprising:
   generating, by an elastic part, an elastic force directed toward the at least one water outlet and on the at least one solenoid valve core,
   wherein when the controller determines that the at least one water outlet is in a closed state and receives a request to open the at least one water outlet from the user, the controller adjusts the magnetic field force to direct away from the at least one water outlet and to be larger than the elastic force on the at least one solenoid valve core so as to move the at least one solenoid valve core away from the at least one water outlet.

6. The method according to claim 5, further comprising:
   maintaining the at least one water outlet in an open state by moving the at least one solenoid valve core toward the at least one water outlet until the at least one solenoid valve core abuts on a sealing gasket sealingly arranged in the at least one magnetic conducting chamber and disposed between a permanent magnet and the at least one solenoid valve core.

7. The method according to claim 5, further comprising:
   maintaining the at least one water outlet in the closed state when the controller determines that the magnetic field force is directed toward the at least one water outlet or the magnetic field force on the at least one solenoid valve core is smaller than the elastic force on the at least one solenoid valve core.

8. The method according to claim 1,
   wherein the controller adjusts the magnetic field force to direct toward the at least one water outlet by providing a forward voltage to the electromagnetic coil.

9. The method according to claim 1,
   wherein the controller adjusts the magnetic field force to direct away from the at least one water outlet by providing a reverse voltage to the electromagnetic coil.

10. The method according to claim 1,
    wherein the controlling comprises controlling a movement of the at least one solenoid valve core between the at least one water outlet and a sealing gasket sealingly arranged in the at least one magnetic conducting chamber.

11. A system for controlling opening and closing of at least one water outlet of an electromagnetic distributor, the system comprising:
    an electromagnetic distributor, comprising:
      a water inlet;
      at least one water outlet in communication with the water inlet;
      at least one magnetic conducting chamber;
      at least one solenoid valve core disposed in the at least one magnetic conducting chamber; and
      an electromagnetic coil configured to generate a magnetic field force on the at least one solenoid valve core in the at least one magnetic conducting chamber;
    a sensor configured to detect a current position, relative to the at least one water outlet, of the at least one solenoid valve core in the at least one magnetic conducting chamber;
    a controller communicably coupled to the sensor and the electromagnetic distributor and configured to:
      determine a current state of the at least water outlet according to the detected current position of the at least one solenoid valve core in the at least one magnetic conducting chamber;
      adjust, in response to a request from a user, a direction and an amount of the magnetic field force on the at least one solenoid valve core according to the determined current state of the at least one water outlet; and control a movement, relative to the at least one water outlet, of the at least one solenoid valve core according to the adjusted direction and the adjusted amount of the magnetic field force on the at least one solenoid valve core.

12. The system according to claim 11, further comprising:
a permanent magnet disposed in the at least one magnetic conducting chamber and configured to generate an attraction, directed away from the at least one water outlet, on the at least one solenoid valve core,
wherein when the controller determines that the at least one water outlet is in an open state and receives a request to close the at least one water outlet from the user, the controller adjusts the magnetic field force to direct toward the at least one water outlet and to be larger than the attraction on the at least one solenoid valve core so as to move the at least one solenoid valve core toward the at least one water outlet.

13. The system according to claim 12,
wherein the at least one water outlet is maintained in a closed state by moving the at least one solenoid valve core toward the at least one water outlet until the at least one solenoid valve core abuts on the at least one water outlet.

14. The system according to claim 12,
wherein the at least one water outlet is maintained in the open state when the controller determines that the magnetic field force is directed away from the at least one water outlet or the magnetic field force on the at least one solenoid valve core is smaller than the attraction on the at least one solenoid valve core.

15. The system according to claim 11, further comprising:
an elastic part configured to generate an elastic force directed toward the at least one water outlet and on the at least one solenoid valve core,
wherein when the controller determines that the at least one water outlet is in a closed state and receives a request to open the at least one water outlet from the user, the controller adjusts the magnetic field force to direct away from the at least one water outlet and to be larger than the elastic force on the at least one solenoid valve core so as to move the at least one solenoid valve core away from the at least one water outlet.

16. The system according to claim 15, further comprising:
a sealing gasket sealingly arranged in the at least one magnetic conducting chamber and disposed between a permanent magnet and the at least one solenoid valve core,
wherein maintaining the at least one water outlet is maintained in an open state by moving the at least one solenoid valve core toward the at least one water outlet until the at least one solenoid valve core abuts on the sealing gasket.

17. The system according to claim 15,
wherein the at least one water outlet is maintained in the closed state when the controller determines that the magnetic field force is directed toward the at least one water outlet or the magnetic field force on the at least one solenoid valve core is smaller than the elastic force on the at least one solenoid valve core.

18. The system according to claim 11,
wherein the controller adjusts the magnetic field force to direct toward the at least one water outlet by providing a forward voltage to the electromagnetic coil.

19. The system according to claim 11,
wherein the controller adjusts the magnetic field force to direct away from the at least one water outlet by providing a reverse voltage to the electromagnetic coil.

20. The system according to claim 11, further comprising:
a sealing gasket sealingly arranged in the at least one magnetic conducting chamber,
wherein the controlling comprises controlling a movement of the at least one solenoid valve core between the at least one water outlet and the sealing gasket.

\* \* \* \* \*